United States Patent [19]

Nakayama

[11] 4,408,181

[45] Oct. 4, 1983

[54] DOCUMENT DATA FILING/RETRIEVAL SYSTEM

[75] Inventor: Naoto Nakayama, Yokohama, Japan

[73] Assignee: Tokyo Shibaura Denki Kabushiki Kaisha, Kawasaki, Japan

[21] Appl. No.: 138,508

[22] Filed: Apr. 9, 1980

[30] Foreign Application Priority Data

Apr. 10, 1979 [JP] Japan .................................. 54-43367
Apr. 16, 1979 [JP] Japan .................................. 54-46483

[51] Int. Cl.³ .......................... G06K 9/00; G06F 7/10
[52] U.S. Cl. ....................................... 82/61; 235/375; 364/900
[58] Field of Search ............... 235/375, 431, 436, 454, 235/379, 487, 494; 364/200 MS File, 900 MS File; 365/49, 235; 360/27; 353/25, 26 A; 340/146.3 AH, 146.3 R, 146.3 H, 146.3 ED; 358/102; 346/94, 95

[56] References Cited

U.S. PATENT DOCUMENTS

| | | | |
|---|---|---|---|
| 2,907,011 | 9/1959 | Kuder | 364/900 |
| 3,066,280 | 11/1962 | Perry | 364/900 |
| 3,872,433 | 3/1975 | Holmes et al. | 340/146.3 AH |
| 4,013,876 | 3/1977 | Anstin | 364/900 |
| 4,021,777 | 5/1977 | Shepard | 340/146.3 AH |
| 4,041,457 | 8/1977 | Koch | 353/26 A |
| 4,074,235 | 2/1978 | Thomas | 364/900 |
| 4,236,227 | 11/1980 | Bull et al. | 365/49 |
| 4,283,621 | 8/1981 | Pembroke | 235/375 |

Primary Examiner—Leo H. Boudreau
Attorney, Agent, or Firm—Cushman, Darby & Cushman

[57] ABSTRACT

A document data filing system used with an index data list bearing the index data associated with the document data on a plurality of documents, comprises read means for reading the document data on the document and the associated index data on the index data list, a first buffer memory for temporarily storing the document data read out by the read means, a second buffer memory means for temporarily storing the index data read by the read means, and a memory control means for applying the document data stored in the first buffer memory, together with the corresponding index data stored in the second buffer memory.

7 Claims, 8 Drawing Figures

F I G. 7
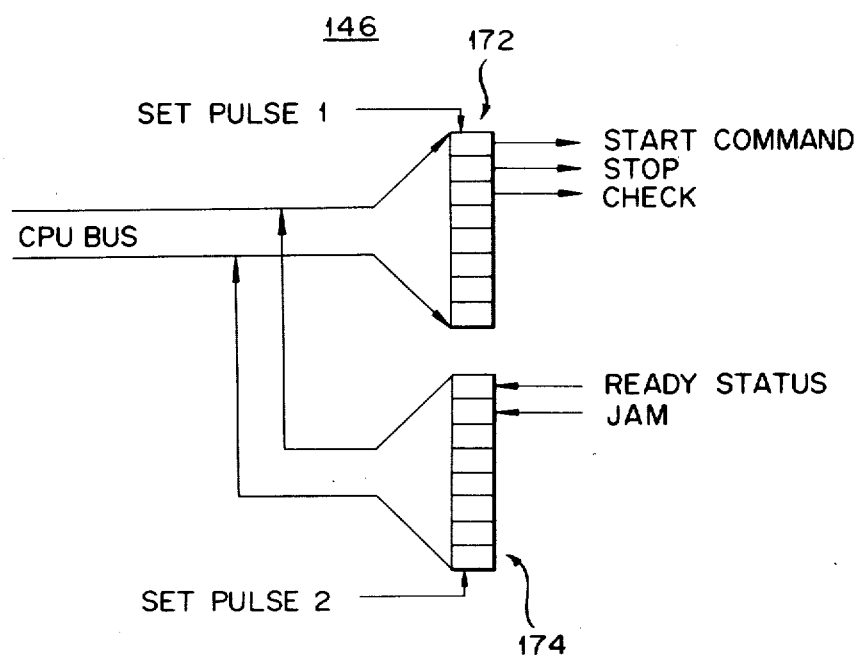

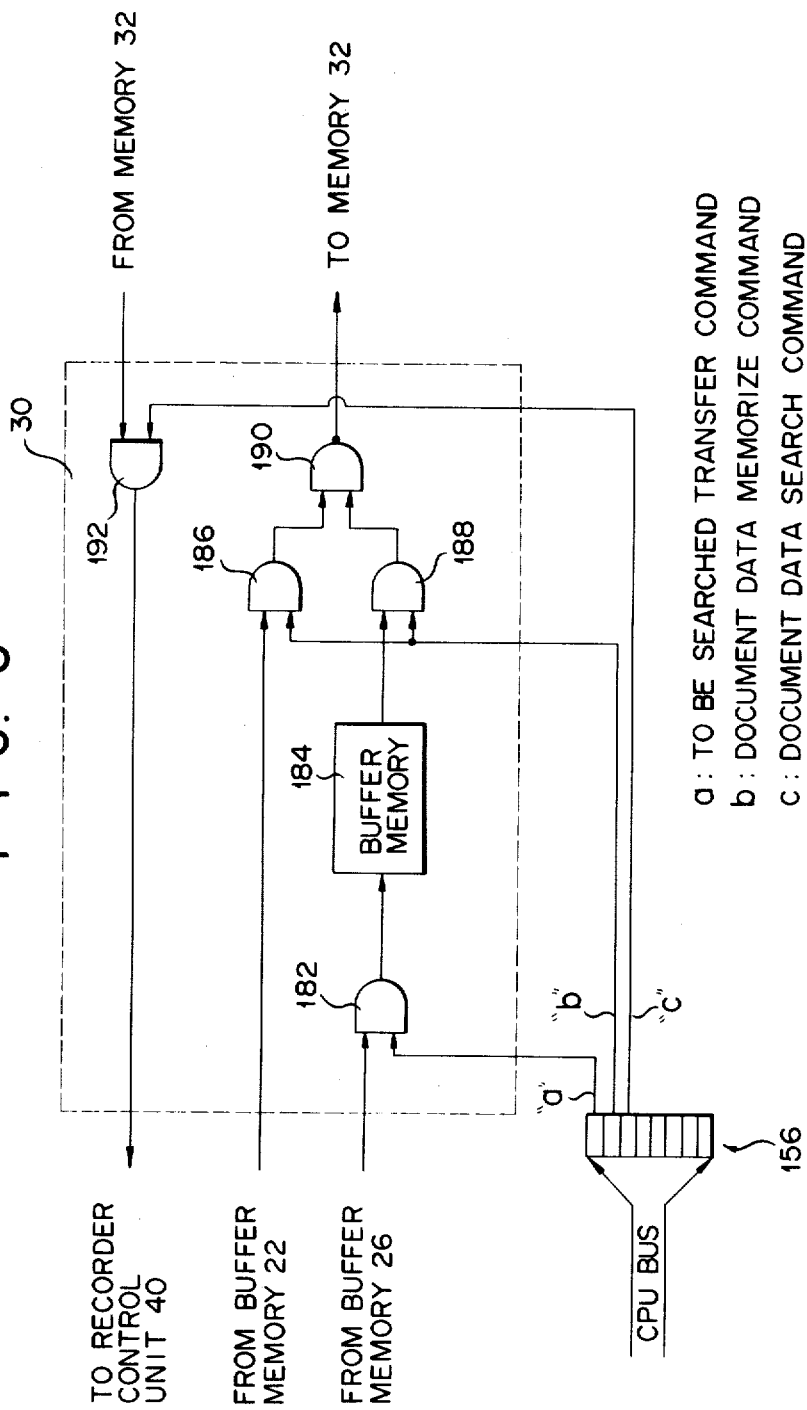

DOCUMENT DATA FILING/RETRIEVAL SYSTEM

BACKGROUND OF THE INVENTION

The invention relates to a document data filing/retrieval system for filing and retrieving a large volume of document data.

In one of the conventional document data filing/retrieval systems, document data of documents, together with the associated index data, are stored in a memory for filing. The index data serves to search document data to be retrieved. A desired document data is retrieved by inputting the corresponding index data into the system. The index data for filing and that for retrieval are inputted through keyboard operations by an operator for each sheet of document. For filing or retrieving a large number of documents, the keyboard operations are enormous and troublesome for the operator, and time consuming work, being attendant with frequent erroneous operations.

SUMMARY OF THE INVENTION

Accordingly, an object of the invention is to provide a document data filing/retrieval system which can input document data and the related index data into the system without any assistance of the keyboard operation by an operator.

Another object of the invention is to provide a document data filing/retrieving system which can input the retrieval data into the system for retrieving desired document data, without any assistance of the keyboard operation.

According to one aspect of the invention, there is provided a document data filing system used with an index data list bearing the index data associated with the document data on a plurality of documents to be filed, comprising: read means for reading the document data on the document and the associated index data on the retrieval data list; a first buffer memory for temporarily storing the document data read out by the read means; recognition means for recognizing the retrieval data read out by the read means; a second buffer memory for temporarily storing the index data recognized by the recognition means; a main memory; and memory control means for loading into the main memory the document data from said first buffer memory and the associated index data from the second buffer memory.

According to another object of the invention, there is provided a document data retrieval system for retrieving desired data document from those having the associated index data stored in a main memory by using a retrieval data list bearing at least the index data, comprising: means for reading the retrieval data on the retrieval data list; recognition means for recognizing the retrieval data read out by the read means; a buffer memory for temporarily storing the retrieval data recognized by the recognizing means; and retrieval means for retrieving the document data associated with the retrieval data stored in the buffer memory from those in the main memory.

Other objects and features of the invention will be apparent from the following description taken in connection with the accompanying drawings, in which:

BRIEF DESCRIPTION OF THE DRAWINGS

FIG. 7 is a block diagram of an interface for a transfer unit used in the system controller; and FIG. 8 is a block diagram of a memory control unit used in the embodiment.

DETAILED DESCRIPTION OF THE PREFERRED EMBODIMENTS

Figure 1:
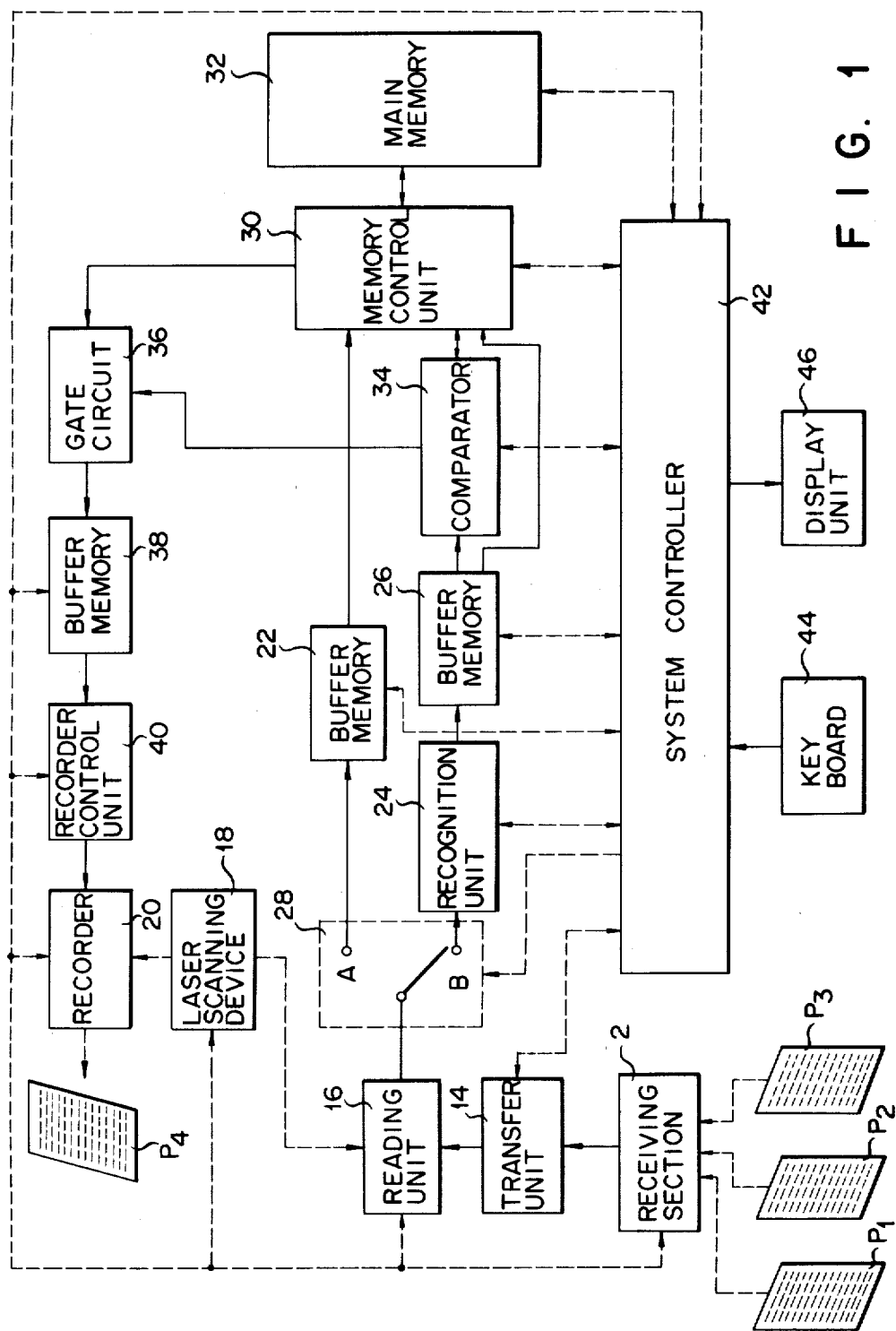
FIG. 1 is a block diagram of a document data filing/retrieval system which is an embodiment of the invention.
Figure 3:
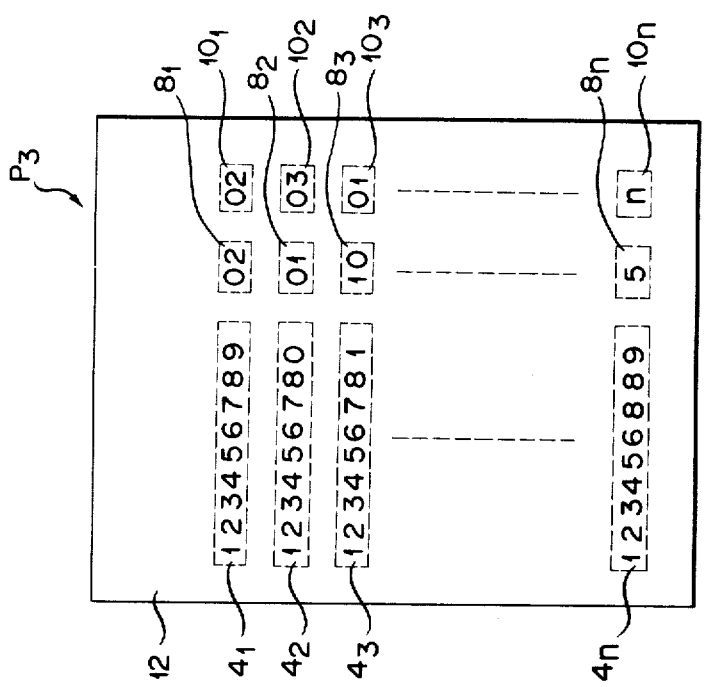
FIG. 3 is an example of a retrieval data list which is used in a retrieval mode.
Figure 2:
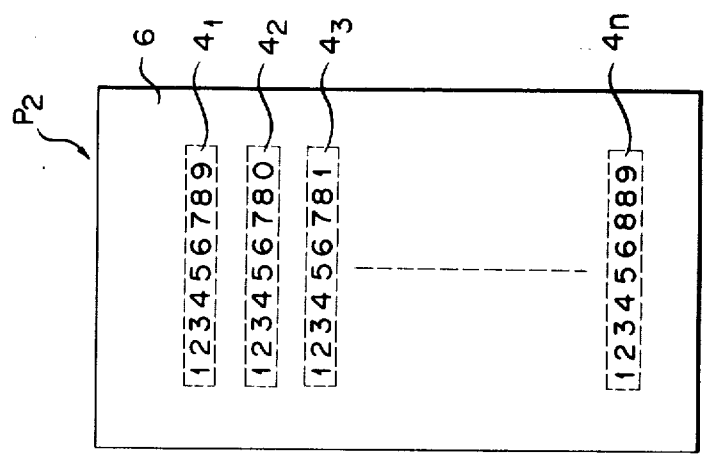
FIG. 2 is an example of an index data list which is used associated with a document to be filed in a filing mode.

Overall System of a Document Data Filing/Retrieval System (FIGS. 1 to 3)

Reference is made to FIG. 1 illustrating in block form an overall system of a document data filing/retrieval system according to the invention.

In the figure, a document receiving section 2 receives documents P1 to be filed, on index data list P2 having index data associated with the document data of the document P1, and a retrieval data list P3 having at least the index data related to the document data on the document P1 to be retrieved. For simplicity of illustration, a sheet of the document P1 is illustrated in the drawing. The index data list has index data $4_1, 4_2, \ldots 4_n$ each expressed with a plurality of digits as a coded expression of the document to be filed, as shown in FIG. 2. Those data are written down or printed on a sheet 6. The retrieval data list P3 has the index data $4_1, 4_2, \ldots 4_n$, data $8_1, 8_2, \ldots 8_n$ for designating the amount of the document data to be retrieved, that is, the data for designating the number of sheets recorded with the document data to be retrieved, and retrieval order data $10_1, 10_2, \ldots 10_n$ for designating the order in which the document data are retrieved. These data are written down or printed on a paper sheet 12.

A transfer unit 14 transfers the document P1 and the data lists P2 and P3 supplied to the receiving section 2 to a read unit 16. A read unit 16 optically reads the contents of the document P1, and the data lists P2 and P3. A laser scanning device 18 is provided to scan the document P1 and the lists P2 and P3 by a laser beam for optically reading the contents of those sheets in cooperation with the read unit 16. The laser scanning device 18 also cooperates with a recorder 20 for recording the document data read out on a record sheet P4. A buffer memory 22 temporarily stores the document data of the document P1 read out by the read unit 16 for each line of the document, and is called a line buffer memory. A recognition unit 24, which is provided with a known character recognition means as known as an optical character read device, for example, recognizes the contents of the lists P2 and P3. A buffer memory 26 temporarily stores the contents of the lists P2 and P3 recognized by the recognition unit 24. A switch 28 provided at the output side of the read unit 16 operates in such a manner that, in a read mode for reading the document data, it is turned to "A" to allow the document data to be supplied to the buffer memory 22. In another read mode for reading the index data on the list P2 or the retrieval data on the list P3, it is turned to "B" to allow the data to be loaded into the recognition unit 24. A memory control unit 30 controls the input and output of the document data and the index data to and from a main memory 32. In inputting the document data and the index data into the main memory 32, it sequentially transfers the document data, which are sequentially inputted into the buffer memory 22, to the main memory 32. At the same time, it reads out the index data corresponding to the document data transferred of one unit, e.g. the document data of one sheet of document, and transfers to the main memory 32. In a retrieval mode, it reads out the retrieval data from the buffer memory 26 and reads out the document data corresponding to the index data contained in the retrieval data read out. The comparator 34 compares the index data of the retrieval data read out from the buffer memory 26 in the retrieval mode with the index data read out from the main memory 32 under control of the memory controller 30. When both the index data coincide with each other, it produces a coincidence signal. A gate circuit 36 is enabled in response to the coincident signal to permit the document data from the memory to pass therethrough. A buffer memory 38 temporarily stores the document data transferred through the gate circuit 36. A recorder control unit 40 controls the recorder 20 in accordance with the contents of the document data stored in the buffer memory 38. A system controller 42 controls the respective logic circuits. The system controller 42 is connected to a keyboard 44 for various operations and a CRT (cathode ray tube) display 46 for displaying the operations and the like.

Figure 4:
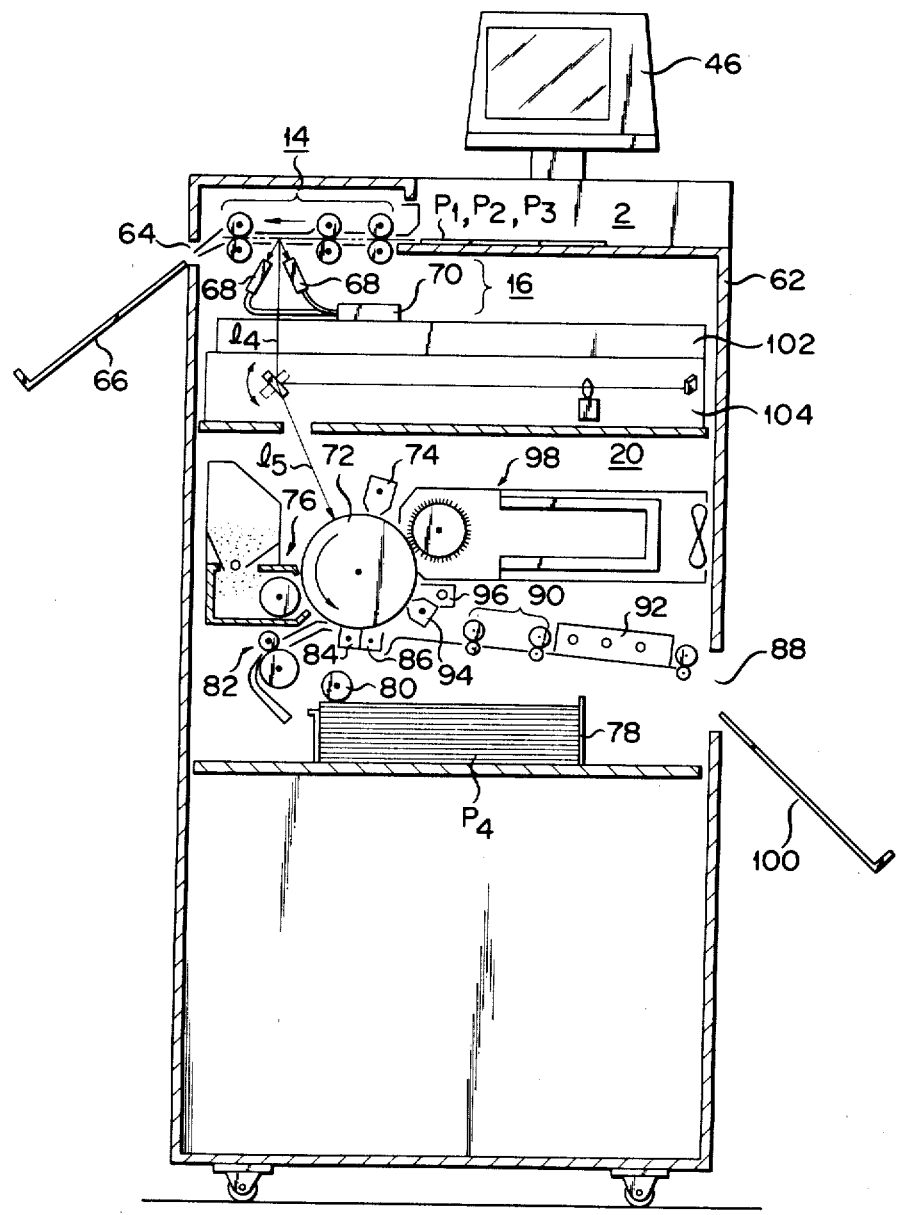
FIG. 4 is a schematic construction of the document data filing/retrieval system according to the invention.

Structure of the Overall System (FIG. 4)

The structure of the essential part of the document data filing/retrieval system according to the invention is illustrated in FIG. 4.

A housing 62 is provided at the upper right side with the receiving section 2 for receiving various documents as mentioned above. The transfer unit or mechanism 14 located on the left side of the receiving section 2 transfers the document P1, the index data list P2 or the retrieval data list P3 substantially horizontally toward an opening 64 provided on the left wall of the housing 62. The document or the lists after passing through the opening 64 is discharged into a tray 66. In the midway of the transfer mechanism 14 is provided the read unit 16. The read unit 16 has a pair of light guides 68 for guiding a read scanning beam l4 coming from the laser scanning device or mechanism 18, of which the detail will be described subsequently, and reflected from the document P1, the index data list P2 or the retrieval data list P3, and a photomultiplier tube 70 which focuses the reflected light beam guided by the light guides 68 and converts it into a corresponding electric signal.

The record unit or mechanism 20 is disposed substantially at the center of the housing 62. In the recording mechanism 20, a drum 72 rotates in a direction of an arrow on which an electrostatic latent image is formed when it is exposed by a scanning beam l5 from the laser scanning mechanism to be described later. A charger 74 charges the photosensing drum 72 before it is exposed. A developer 76 inversely developes the latent image formed on the drum 72. A cassette 78 contains record sheets P4. The record sheet P4 is taken out from the container cassette 78 by a sheet feed roller 80 which in turn feeds the sheet to a transfer mechanism 82. The transfer mechanism 82 transfers the sheet P4 to a transfer section. A transfer charger 84 transfers the toner image on the photosensitive drum 72 onto the sheet P4 in the transfer section. A peeling charger 86 peels the sheet P4 from the photosensitive drum 72. Another transfer mechanism 90 guides the sheet P4 peeled into a discharge port 88. A fixing device 92 fixes the toner image being transferred by the transfer mechanism 90. A charger 94 discharges the photosensitive drum 72 after the transfer is completed. A fluorescent lamp 96 erases the latent image on the drum 72. A cleaner 98 cleans the drum 72 surface. The record mechanism thus constructed is the same as the conventional electrophotographying machine. A tray 100 is installed at the outer side of the housing, which receives the recorded sheet P4 discharged through a discharge port 88.

Between the transfer mechanism 14 and the record unit 20 are provided a laser oscillator 102 and a black box 104 including therein the laser beam scanning device or mechanism 18 commonly used for both the read unit 16 and the record unit 20.

Figure 5:
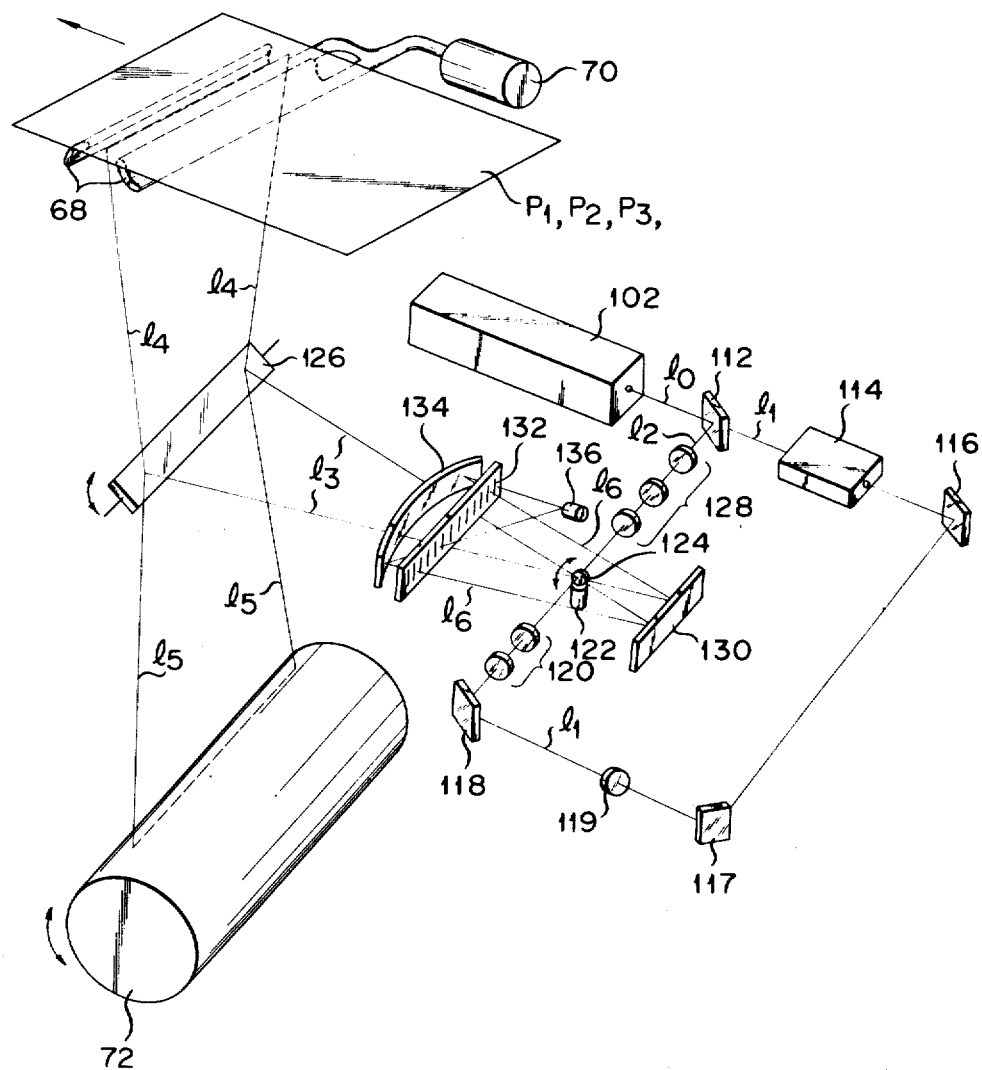
FIG. 5 is a schematic diagram of a laser scanning system used in the embodiment of the invention.

Laser Beam Scanning Mechanism (FIG. 5)

An example of the structure of the laser beam scanning mechanism 18 is illustrated in FIG. 5.

A laser beam $l_0$ emitted from a laser beam oscillator 102 is splitted into two directional beams $l_1$ and $l_2$ by a beam splitter 112. The splitted beam $l_1$ passes through an optical modulator 114 and through reflectors 116, 117 and 118 and reaches one of the surface of a reflecting mirror 124 of a light scanner 122 called a Galvano mirror. The laser beam from the reflecting mirror 124 is directed toward the document, or the data list P2 or P3 and to the drum 72 of the record unit 20, as a scanning beam $l_3$. The scanning beam $l_3$ enters mode selector mirror 126 which produces a scanning beam $l_4$ for reading the data of the document P1, or the data list P2 or P3 and an exposure beam $l_5$ for recording the document data of the document retrieved. When the scanning beam $l_3$ serves as the read scanning beam $l_4$, the optical modulator 114 is set to a "bright" mode. When it serves as the exposure scanning beam $l_5$, the optical modulator 114 modulates the intensity of the light beam $l_1$ in accordance with the signal representing the document data retrieved. A lens 119 disposed between the reflectors 117 and 118 and a lens system 120 between the reflector 118 and the optical scanner 122, serve both to focus the laser beam.

The splitted beam $l_2$ from the beam splitter 112 is led to the other reflecting surface of the reflecting mirror 124 through an optical system for beam focussing consisting of a plurality of lenses, and then is reflected by the reflector 130 to be a scanning beam $l_6$ for scanning a timing scale 132 for determining the generation timing of timing clock pulses for scanning speed correction. The scale 132 made of material blocking the beam is provided with a plurality of holes arranged at fixed intervals in its longitudinal direction. The scanning beam $l_6$ scans the timing scale 132 from one end to the other at a fixed speed determined by the operation speed of the reflecting mirror 124 of the optical scanning device 122. Through the scanning, the scanning beam $l_6$ are successively derived from the holes at the fixed intervals. The beam $l_6$ passing through the timing scale 132 is reflected by a concave mirror 134 to enter a photomultiplier tube 136 where it is converted into an electrical signal. In response to the successive scanning beams $l_6$ coming through the holes of the timing scale 132, the photomultiplier tube 136 produces clock pulses at fixed timings. The clock pulses are used for correcting the scanning speed or as timing signals for signal processing.

Operation

The explanation to follow is for the operation of the document data filing/retrieval system thus constructed.

For filling documents, the index data list P2 as shown in FIG. 2 relating to the documents to be filed is prepared and is set in the receiving section 2, facing down. The data list P2 is detected by a detecting means (not shown) and the mode selector mirror 126 of the scanning mechanism 18 is set to a read mode. At the same time, the transfer mechanism 14 operates to transfer the index data sheet P2 to the opening 64 through the transfer path. When the data list P2 reaches the read unit 16 where the data surface of the data list P2 is scanned by the scanning beam $l_4$ coming from the scanning mechanism 18. At this time, the data list P2 is continuously transferred, so that the entire surface of the data list P2 is scanned by the scanning beam $l_4$. The read scanning beam reflected from the data list P2 is received at one end of each light guide 68 and is focused at the other end with a substantially circular cross section. Then, it is led to the photomultiplier converter 70 where it is converted into an electrical signal. The distribution of the light intensity of the laser beam reflecting from the data list P2 represents a state on the surface of the index data list P2 bearing sets of numerals. Accordingly, the reflecting beam from the surface of the data list P2 includes the information of the data list surface, and the output signal from the photomultiplier 70 includes the same information.

The output signal from the photomultiplier or the opto-electric converter 70 is supplied to the recognition unit 24 since the switch 28 is turned to the contact "B". The recognition unit 24 sequentially recognizes the output signal from the read unit 16, i.e. the index data read out, and loads it into the buffer memory 26.

Upon the completion of the data loading into the buffer memory 26, the switch 28 is turned to the contact "A" under control of the system controller 42. At the same time, the display unit 46 displays that the supply of the document P1 is allowed. Seeing the display, an operator supplies the documents P1 corresponding to the index data of the data list P2 in the order of the index data recorded, for example. When the document P1 is supplied, the document data of the document P1 is read out by the read unit 16, as in the manner of the list P2. The document data is transferred to the buffer memory 22 for each line, through the switch 28 which is turned to the contact "A". In this way, when the document data of one unit is supplied to the buffer memory 22, the one unit document data is supplied to the main memory 32 under control of the memory control unit 30 and the index data corresponding to the document data is read out of the buffer memory 26 and is supplied to the main memory 32. The main memory 32 may, for example, be a metal coated glass disc. In writing data into the disc, the laser beam is on-off modulated in accordance with the document data signal from the buffer memory 22 or the index data signal from the buffer memory 26. The memory disc is melted with the laser beam modulated while being rotating, thereby to record the data in the form of pit pattern. The document data of each unit supplied to the buffer memory 22, together with the corresponding index data, are sequentially loaded into the main memory 32. In this case, the index data may be loaded into the main memory before or after the document data is loaded into the same.

Consider now a retrieval mode for retrieving the document filed. For retrieving documents stored in the main memory in a given order and by a given number, a retrieval data sheet P3 is prepared, which has, as shown in FIG. 3, the index data $4_1, 4_2, \ldots 4_n$ corresponding to the document data to be retrieved, the data $8_1, 8_2, \ldots 8_n$ for designating the number of sheets recorded with the document data to be retrieved, and the order data $10_1, 10_2, \ldots 10_n$ for designating the order of retrieving and outputting the document data. The retrieval data sheet P3 is set in the receiving section 2, facing down. The data sheet P3 is transferred by the transfer mechanism 14 along the transfer path and the contents thereof is read by the read unit 16, as in the case of the document P1 and the index data sheet P2. The retrieval data is transferred through the switch 28 now being at the contact "B" to the recognition unit 24 where those are recognized. Then, the retrieval data is loaded into the buffer memory 26 for the temporary storage therein. In this way, the index data $4_1, 4_2, \ldots 4_n$, the number-of-sheet data $8_1, 8_2, \ldots 8_n$, and the retrieval order data $10_1, 10_2, \ldots 10_n$ on the retrieval data list P3 are sequentially loaded into the buffer memory 26 for the temporary storage.

Upon the storage of the retrieval data, the system controller 42 sets the mode select mirror 126 to the exposure mode. In this mode, the beam $l_3$ is directed as the beam $l_5$ toward the photosensitive drum 72 to expose the photosensitive drum 72. At this time, the memory control unit 30 reads out the index data of the retrieval data of the document data firstly specified for the retrieval, under control of the system control unit 42. The index data of the retrieval data is supplied to the comparator 34, while at the same time the index data stored in the main memory 32 are read out and supplied to the comparator 34. In this case, if the main memory 32 is the disc, the index data recorded on the outermost periphery and the address data of the document data corresponding to the index data are first read out. The comparator 34, when receiving those data, sequentially compares the index data of the retrieval data supplied from the buffer memory 26 with the index data sequentially read out from the main memory 32. When both the index data are coincident with each other, the comparator 34 produces a coincident signal to the memory control unit 30 and to the gate circuit 36. Upon receipt of the coincident signal, the memory control unit 30 responds to the address data of the document data corresponding to the coincident index data thereby to read out the document data stored in the address of the main memory 32. The document data is supplied through the gate circuit 36 to the buffer memory 38. On the basis of the document data stored in the buffer memory 38, the recorder controller 40 activates a modulator driver (not shown) to drive the optical modulator 114 (FIG. 5) in the record section 20 to control the degree of modulation of the optical modulator 114. As a result, the laser beam $l_1$ in the scanning mechanism shown in FIG. 5 is intensity-modulated in accordance with the document data retrieved and is directed toward the photosensitive drum 72 by the mode select mirror 126 as the beam $l_5$. With the beam $l_5$, the photosensitive drum 72 is exposed thereby to form an electrostatic latent image of the document data on the drum 72. The latent image is inversely developed by the developer 76 to be visualized as a toner image. When the toner image reaches the transfer section, it is transferred to the record sheet P4 by the charger 84. The record sheet P4 is transferred to the transfer section at the timing of the arrival of the toner image. The record sheet P4 with the toner image is carried along the carrying or transfer path by the transfer or carrying mechanism or unit 82 to the fixing unit 92 where it is fixed on the record sheet P4. The record sheet P4 is discharged through the discharge opening 88 to the tray 100. When the number-of-sheet data designates one sheet of recording, the recording operation is performed one time and then the buffer memory 38 is cleared. When a plurality of sheets for recording are designated, the recording operations are performed by the corresponding number of times and then the contents of the buffer memory 38 are cleared.

When the document data firstly specified is retrieved and recorded, the memory control unit 30 reads out the index data of the retrieval data secondly specified from the buffer memory 26 and applies it to the comparator 34. Then, it sequentially reads out the index data stored in the main memory 32 and applies them to the comparator 34. Subsequently, the operation similar to that performed when the first document data is retrieved and recorded, is performed to record the corresponding document data for the output. In this way, the document data of the plurality of the documents are sucessively retrieved and the document data are copied.

When the document data corresponding to the index data described on the retrieval data list P3 are all retrieved and recorded or copied, the memory control unit 30 clears the contents or the retrieval data in the buffer memory 26, and the system is ready for the next retrieval operation.

Useful Effects and Modifications

As described above, the document data filing/retrieval system according to the invention uses the data sheet for inputting the index data or the retrieval data and reads the data sheet by means of the optical read means. Accordingly, there is eliminated the keyboard operations for inputting such data. As a result, the time taken for inputting such data is shortened, the keyboard operation work by the operator is alleviated, and thus a possibility of occurrence of the erroneous keying operation is lessened.

In the embodiment as mentioned above, when the index data read from the main memory 32 is completely coincident with the index data of the retrieval data list P3, the document data corresponding thereto is read out from the main memory 32. Alternatively, the system may be so designed that, when the numerals of the index data are coincide with by about 80%, the corresponding document data is read out. In this modification, the correct retrieval is ensured even if the retrieval data is read by the read unit 16 with error of several characters. Accordingly, there may be prevented such a failure of the data retrieval due to non-coincidence between the index data as would occur in the key operation. Further, the optical disc for the main memory 32 may be substituted by a magnetic disc or a video tape record memory, for example.

Figure 6:
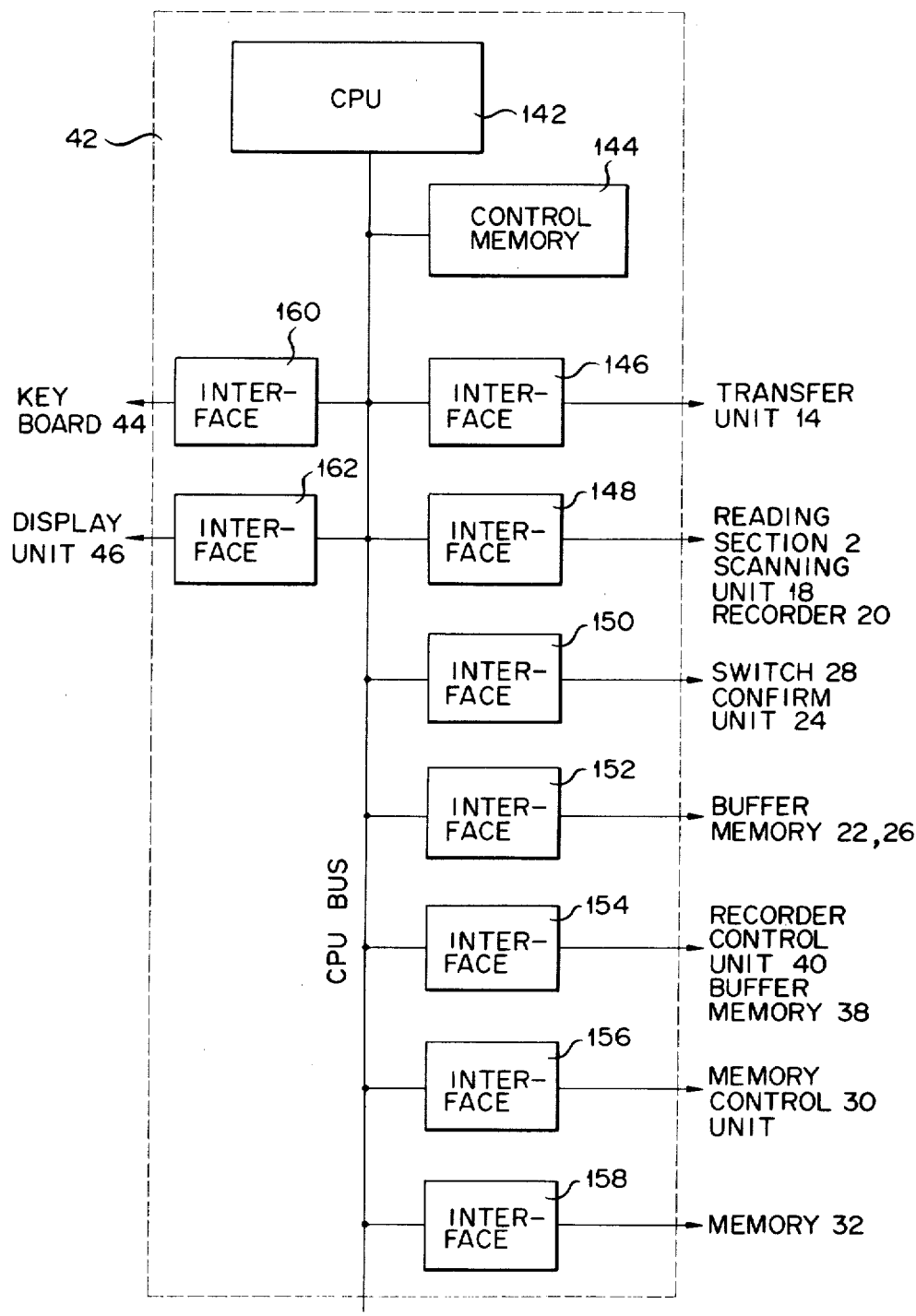
FIG. 6 is a block diagram of a logic construction of a system controller used in the embodiment.

System Controller (FIG. 6)

The detail of the system controller 42 used in the circuit shown in FIG. 1 will be described referring to FIG. 6.

As shown, the system controller 42 includes a central processing unit (CPU) as a microprocessor denoted as numeral 142, a control memory 144 for storing control programs, and various interfaces. Those interfaces are: an interface 146 for the transfer mechanism, an interface 148 for the read unit, the scanning mechanism, and the record unit, an interface 150 for the switch and the recognition unit, interface 152 for the buffer memories 22 and 26, an interface 154 for the recorder control unit and the buffer memory, an interface 156 for the memory controller, an interface 158 for the main memory, a keyboard interface 160 and a display unit interface 162. Those interfaces are coupled with the CPU 142 through a CPU bus. The respective interfaces are controlled by the command outputted from the CPU 142 and status data coming from the respective device connecting to the interfaces. The construction of the transfer mechanism interface 146 is as shown in FIG. 7.

Interface for the Transfer Mechanism

The interface 146 for the transfer mechanism shown in FIG. 7 is designed so as to be adaptable for the CPU bus of 8 bits, and is comprised of two 8-bit registers 174 connected to the CPU buses. The register 172 responds to a command formed by a plurality of pulses to control the transfer mechanism 14. For example, when the CPU 142 issues a command for starting the transfer mechanism 14, which expressed by "10000000", and is loaded into the 8-bit register 172, the transfer mechanism 14 starts to operate to transfer the document P1, or the data list P2 or P3 toward the read unit 16. When the CPU 142 issues a command for stopping the transfer mechanism 14, which is expressed by "01000000", and is set in the 8-bit register 172, the transfer mechanism 14 stops its operation.

Memory Control Unit (FIG. 8)

The detail of the memory control unit 30 in the circuit in FIG. 1 is illustrated in FIG. 8. For easy of illustration, the memory control circuit shown in FIG. 8 is illustrated in combination with the interface 156 for the memory control unit 30.

In the memory control unit 30, an AND gate 182 ANDs the output signal from the buffer memory 26 with a command for transferring the index data or the retrieval data from the interface 26. A buffer memory 184 temporarily stores the output signal from the AND gate 182. An AND gate 186 ANDs the document data from the buffer memory 22 and a command for storing the document data from the interface 156. An AND gate 188 ANDs the index data stored in the buffer memory 184 or the retrieval data and a command for storing the document data from the interface 156. A NOR gate 190 NORs the output from the AND gate 186 and the output from the AND gate 188. An AND gate 192 ANDs the document data read out from the main memory 32 and a command for reading the document data from the interface 156.

The operation of the memory control unit 30 is performed under control by the command from the CPU 142 within the system controller 42, through the interface 156. For storing the document data and the index data into the main memory 32, the CPU 142 produces an index data transfer command which in turn enables the AND gate 182 to permit the index data from the buffer memory 26 to pass therethrough to the buffer memory 184. Then, the CPU 142 produces a document data storing command which enables the AND gates 186 and 188 to permit the index data and the document data to pass therethrough. The index data and the document data after passing through the AND gates 186 and 188 are inputted to the memory 32 through the NOR gate 190.

In reading the document data, the CPU 142 produces a document data read command which enables the AND gate 192 so that the document data is read out from the main memory 32 through the AND gate 192 into the control unit 40.

Obviously many modifications and variations of the present invention are possible in the light of the above teachings. It is therefore to be understood that within the scope of the appended claims in the invention may be practiced otherwise than as specifically described.

What is claimed is:

1. A document data filing and retrieval system used with an index data list bearing the index data associated with the document data in a plurality of documents to be filed, and a retrieval data list bearing the index data associated with the document data in a plurality of documents to be retrieved, comprising:
   a single read means for optically reading the document data on the documents and the associated index data on the index data list and the retrieval data list;
   a first buffer memory for temporarily storing the document data read by said read means;
   recognizing means for recognizing the index data read by said read means;
   a second buffer memory for temporarily storing the index data recognized by said recognizing means;
   switch means coupling said first and second memories to said single read means for supplying said document data to said first buffer memory and said index data to said second buffer memory;
   a main memory; and
   memory control means for loading into said main memory the document data from said first buffer memory and the associated index data from said second buffer memory.

2. A system according to claim 1, further comprising:
   a receiving section for receiving said documents and said index data list;
   a transfer mechanism for transferring said documents and said index data list from said receiving section to said read means.

3. A document data filing system according to claim 1, further including retrieval means for retrieving the document data associated with the index data of the retrieval data stored in said second buffer memory from those in said main memory.

4. A system according to claim 3, wherein said retrieval means includes a comparator which compares the index data contained in the retrieval data stored in said buffer memory with the index data stored in said main memory and, when both the data are coincident with each other, produces a coincident signal; control means which reads out the index data contained in the retrieval data stored in said buffer memory in a given order and supplies the data into said comparator while at the same time sequentially reads out the index data stored in said main memory and supplies the data to said comparator; and means which responds to the coincident signal from said comparator to read out the corresponding document data.

5. A system according to claim 3, wherein said retrieval data further contains the data for designating the number of sheets recorded with the document data to be retrieved.

6. A system according to claim 3, wherein said retrieval data further contains the data for designating an order of reading out the document data to be retrieved.

7. A system according to claim 3, further comprising recording means for recording the document data retrieved on a sheet.

* * * * *